United States Patent [19]

Matsumoto

[11] 4,205,969
[45] Jun. 3, 1980

[54] ELECTROSTATIC AIR FILTER HAVING HONEYCOMB FILTER ELEMENTS

[75] Inventor: Toshitsugu Matsumoto, Isehara, Japan

[73] Assignee: Masahiko Fukino, Tokyo, Japan

[21] Appl. No.: 888,794

[22] Filed: Mar. 21, 1978

[30] Foreign Application Priority Data

Mar. 21, 1977 [JP] Japan .................................. 52-030837

[51] Int. Cl.² .................................................. B03C 3/00
[52] U.S. Cl. ........................................ 55/131; 55/138; 55/151; 55/155
[58] Field of Search ................... 55/103, 131, 136–138, 55/155, 151

[56] References Cited

U.S. PATENT DOCUMENTS

| 2,885,026 | 5/1959 | DiVette | 55/138 |
| 3,793,802 | 2/1974 | Handt | 55/156 |
| 3,820,306 | 6/1974 | Vincent | 55/155 |
| 3,999,964 | 12/1976 | Canz | 55/138 |
| 4,007,024 | 2/1977 | Sallee et al. | 55/138 |

FOREIGN PATENT DOCUMENTS 968982  9/1964  United Kingdom ...................... 55/138

*Primary Examiner*—Bernard Nozick
*Attorney, Agent, or Firm*—Townsend and Townsend

[57] ABSTRACT

An electrostatic air filter for the removal of particulate matter such as dust, smoke and the like from air. The filter has an ionizing section in which the particles are electrically charged and a filter section defined by one or more dielectric honeycomb filter elements arranged so that the air flows through the honeycomb cells. The filter elements are placed in an electric field so that the previously charged particles are deflected sideways as they flow through the honeycomb cells and impinge on and adhere to the cell walls. The honeycomb cells are periodically cleaned or replaced with new ones.

15 Claims, 8 Drawing Figures

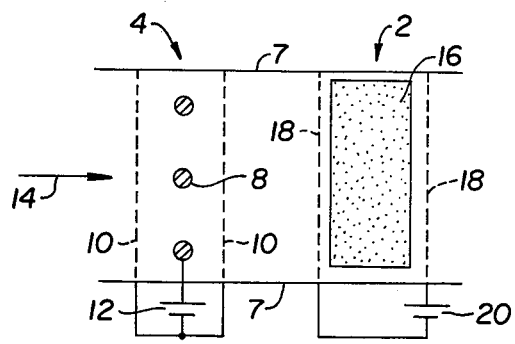
FIG._1.
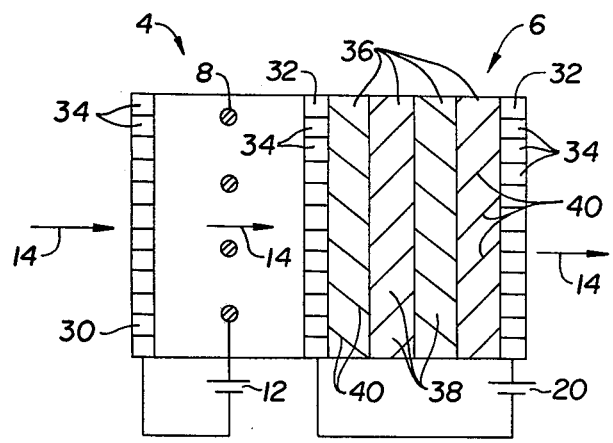
FIG._4.
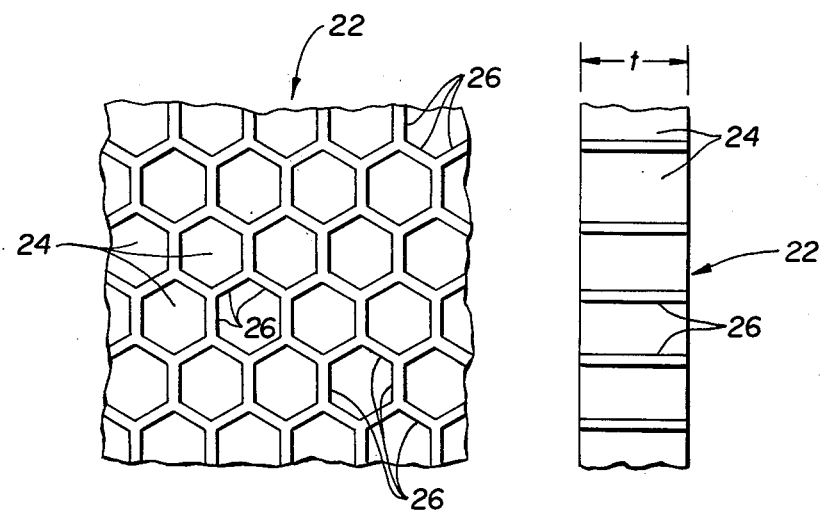
FIG._2.   FIG._3.

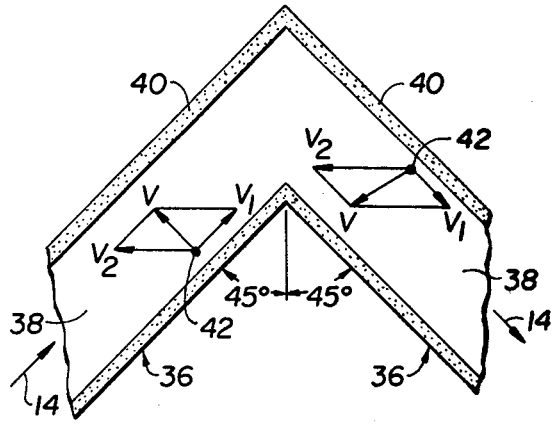
FIG._5.
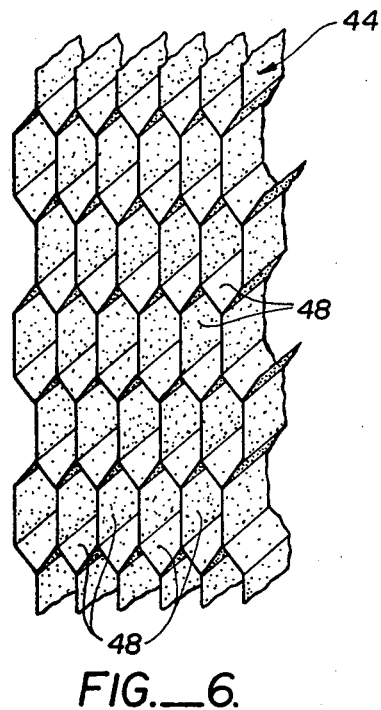
FIG._6.
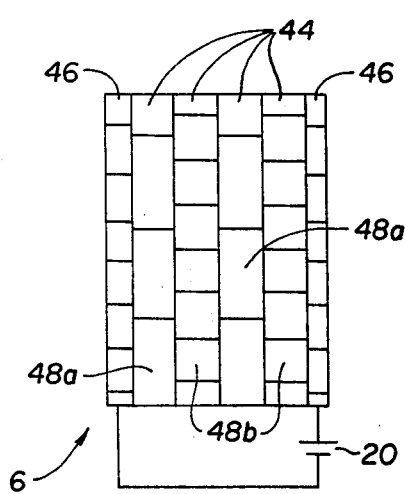
FIG._7.
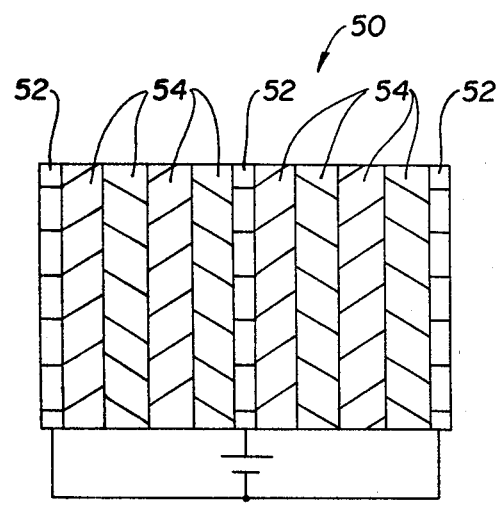
FIG._8.

ELECTROSTATIC AIR FILTER HAVING HONEYCOMB FILTER ELEMENTS

BACKGROUND OF THE INVENTION

The present invention relates to an electrostatic air filter for removing from the air (or any other gas) relatively small particles.

In the past, a variety of dust collecting devices have been used to remove dust particles, mist, smoke particles and the like from gaseous material and particularly from air (hereinafter collectively referred to as "air"). In the more recent past, such dust collectors were constructed in the form of electrostatic air filters. They have the advantage of being relatively easy to maintain, similar in many respects to the theretofore more common mechanical filters. In addition, such filters exhibit the improved efficiency for collecting fine particles which is common to electrostatic precipitators.

Generally speaking, such electrostatic air filters are defined by two distinct sections. A first, upstream section ionizes the dust particles by flowing the air past a pair of electrodes. A corona discharge between the electrodes electrically charges the particles. Downstream of the ionizing section is a dust collecting filter which causes the removal of the charged dust particles from the air streaming past it. In addition, such filters may include a particle coagulator which coagulates charged fine particles to a larger size to facilitate the subsequent collection of the dust by the filter.

Typically, the filters had filter bodies constructed of glass, asbestos, natural or synthetic fibers such as cellulose or nylon, resin, grain material such as allumina or diatomaceous earth and the like. In order to effectively filter the dust from the air stream prior art filter bodies had to be constructed relatively dense and/or thick in the direction of air flow to assure that the particles impinge on the filter body. Only then would the filter remove the particle from the air stream. Thus, it was necessary to construct the filter of multiple, finely divided and closely adjacent strands, fibers, etc. to interrupt the laminar air flow and entrap the particles before they left the filter. This, in turn, increased the filter's flow resistance and thereby decreased its overall capacity. This drawback becomes more serious with an increase in the amount of filtered out material adhering to the filter element which in time could effectively clog it. In addition, this construction rendered prior art filters relatively difficult to maintain.

SUMMARY OF THE INVENTION

The present invention seeks to overcome the shortcomings encountered with prior art air filters by decreasing its flow resistance yet increasing its ability to remove from the air stream even relatively fine dust particles which, in the past, required a separate coagulator and/or a relatively high density filter element. Generally speaking, this is accomplished by constructing the filter element of one or more expanded honeycomb cores in which the cells face in the direction of the air flow. The honeycomb cores are placed in an electric field so as to deflect dust particles flowing through the cells from their normal path. This imparts to the particles a lateral motion component and causes them to impinge on the cell walls. Due to their electric charge they adhere to the cell walls and are thereby removed from the air flow.

Accordingly, in a preferred embodiment of the invention, the electrostatic filter comprises a first, ionizing section which may be constructed of a pair of spaced apart, relatively thin and, therefore, low flow resistance honeycomb cores and between which there is an electrically charged ionizing wire mesh or the like to effect a corona discharge. Dust particles flowing through the ionizing section are thereby electrically charged.

Downstream of the ionizing section a filter section constructed of one or more partially or fully expanded honeycomb cores constructed of a dielectric material such as paper, polyvinyl chloride (PVC) or the like. An electric field is generated in the space occupied by the honeycomb filter cores which deflects the dust particles from their normal path so that they impinge upon the honeycomb cell walls. Due to their charge, the particles adhere to the walls and are thereby removed from the air flow.

To enhance the filtering capacity and efficiency, the honeycomb may be constructed so that the cell walls are angularly inclined relative to the normal air flow direction therethrough. In addition, two or more serially arranged filter elements may be arranged so that the air flow through the filter is angularly deflected one or more times which increases the likelihood that a given dust particle will impinge on a cell wall and will thus be removed from the flow.

Since honeycomb is constructed of very thin material ribbons glued together at spaced apart intervals and thereafter expanded into the desired cell shape, the flow resistance of a honeycomb filter is relatively low and in any event much lower than common prior art air filter elements. Even though, the cells can be made relatively thick (in the flow direction) so that the overall dust collecting surface of the filter is quite large to increase the dust collecting efficiency and capacity. As a result, even substantial amounts of accumulated dust particles only nominally reduce the unobstructed flow through cross-section and thus do not appreciably increase the flow resistance of the filter. This allows a continued, relatively large flow through volume and enables the operation of the filter with lesser maintenance, e.g. cleaning and/or replacement, thereby significantly reducing the operating cost for the filter.

Additionally, the honeycomb filter elements of the present invention can be constructed of low cost materials such as paper or plastic and they can be manufactured from low cost bulk honeycomb by simply slicing them therefrom. They are, therefore, relatively inexpensive and can be throwaway items. By correspondingly engineering the filter elements and their mounting in the overall filter the filter replacement can be made a simple, routine task that can be performed by people lacking technical skills without having to engage high priced service personnel.

Consequently, the present invention not only represents a significant improvement in regard to the efficiency and capacity of air filters but, moreover, it can lead to significant overall cost savings.

BRIEF DESCRIPTION OF THE DRAWINGS

FIG. 1 is a schematic, overall view of an electrostatic air filter constructed in accordance with the present invention;

FIG. 2 is a side elevation of a honeycomb filter element constructed in accordance with the present invention and utilized in the electrostatic filter shown in FIG. 1;

FIG. 3 is a side elevation of the filter element shown in FIG. 2;

FIG. 4 is a schematic overall view of an electrostatic filter constructed in accordance with the present invention and employing honeycomb electrodes;

FIG. 5 is a fragmentary, enlarged plan view, in section, through a portion of a dielectric filter element employed in the electrostatic filter shown in FIG. 4 and graphically illustrates the manner in which dust particles are collected on the side walls of the honeycomb cells;

FIG. 6 is a fragmentary, perspective view of a filter element made of partially expanded honeycomb;

FIG. 7 is a schematic representation of the dust collecting portion of the filter constructed in accordance with another embodiment of the present invention; and FIG. 8 is similar to FIG. 7 but shows yet another embodiment of the invention.

DESCRIPTION OF THE PREFERRED EMBODIMENTS

Referring first to FIG. 1, an electrostatic air filter 2 constructed in accordance with the present invention generally comprises an ionizing section 4 and, downstream thereof, that is to the right as seen in FIG. 4, a dust collecting or filter section 6 disposed within a suitable housing, e.g. within a duct 7. The ionizing section is constructed of an ionizing wire or wire mesh 8 and a pair of spaced apart, permeable electrodes 10 on either side of the wire. In the preferred embodiment of the invention the permeable electrodes 10 are defined by relatively thin honeycomb cores as is further described below. The required electric potential from a source 12 is applied to the ionizing wire mesh 8 and the permeable electrodes 10 to generate a corona discharge between them.

A gas, e.g. air flows in a downstream direction, that is to the right as viewed in FIG. 1 as indicated by arrow 14. Suspended in the gas flow are fine particles, e.g. dust, smoke, mist and the like which are to be removed by the electrostatic filter 2. The air stream enters the permeable electrodes 10 and the suspended particles in the stream are charged by the corona discharge between wire mesh 4 and electrodes 10.

Filter section 6 is defined by a filter element 16 constructed of an expanded honeycomb in which the honeycomb cells extend in the direction of the air flow. The honeycomb filter element is constructed of a dielectric material such as paper, PVC, polyethylene or the like and it is placed in an electric field generated between a pair of spaced apart, permeable electrodes 18 electrically connected to a corresponding source 20.

As the dust laden air stream flows in a downstream direction through the honeycomb cells, the electric field generated by the electrodes 18 imparts to the particles a sideway motion, as is further discussed below so that the particles impinge on the side walls and, due to their electrostatic charge, they adhere thereto for later removal.

Referring now momentarily to FIGS. 2 and 3, a honeycomb panel 22 as used in filter element 16 (FIG. 1) is preferably sliced from an unexpanded honeycomb block at the desired thickness "t" (FIG. 3). Thereafter, the panel is expanded so as to define individual, generally hexagonal honeycomb cells 24 which are spaced apart by cell walls 26. The honeycomb can be fully expanded so as to define substantially true hexagons or the expansion may be limited so as to define oblong cell cross-sections (see FIG. 6).

The honeycomb itself is made from thin, ribbon-like foil of the desired material, e.g. paper, which has a very small cross-section (the cell wall thickness shown in FIG. 2 is exaggerated for purposes of illustration only) so that the overall flow resistance of the honeycomb filter panel 22 is relatively low. Each cell 24 is defined by relatively deep cell walls and surrounding relatively large cell wall surfaces which enhance the amount of dust that may be collected thereon without significantly decreasing the unobstructed cross-section of the cell. As a result, the air throughput volume can remain relatively constant and high while the cleaning (or replacement) intervals for the honeycomb filter element can be significantly prolonged as contrasted to prior art filters.

Additionally, since the honeycomb filter elements can be made from low cost materials, e.g. paper or plastic, they are relatively inexpensive. Thus, instead of requiring their tedious cleaning after extended use periods, they can be simply discarded and replaced with new filter elements. This significantly enhances the ease of using the filter without or with only a negligible increase in its operating costs.

Referring now to FIG. 4, an electrostatic air filter 28 is generally constructed similar to air filter 2 shown in FIG. 1. Thus, it includes an ionizing section 4 and a filter section 6. The ionizing section includes an ionizing wire mesh 8 placed downstream of and spaced apart from a permeable electrode defined by a honeycomb electrode element 30 constructed of aluminum or another electrically conductive material. As before an electric potential is applied to the wire mesh and the honeycomb electrode 30 by source 12 so as to effect a corona discharge therebetween and correspondingly charge particles suspended in air flow 14.

The filter section 6 is defined by a pair of spaced apart honeycomb electrodes 32 to which an electric charge is applied by source 20. All honeycomb electrodes, that is electrodes 30 and 32 are oriented so that their cells 34 are essentially parallel to air flow 14 so as to minimize their flow resistance.

Sandwiched between honeycomb electrodes 32 of filter elements 6 are a plurality of serially arranged honeycomb filter elements 36 constructed of PVC honeycomb panels, for example, and which have honeycomb cells 38 which are angularly inclined relative to the air flow direction 14, for example, by an angle of about 45°. Preferably, the angle between the cells of adjacent honeycomb panels is between about 45° to 90°. The successive filter elements are arranged so that gas flowing through filter section 6 must repeatedly impinge on cell walls 40 to change its flow direction.

Referring now to FIGS. 4 and 5, FIG. 5 represents an enlarged portion of two adjoining filter elements 36 utilized in the electrostatic filter 28 shown in FIG. 4. Two adjoining cell walls 38 are angularly inclined with respect to each other by 90° and the air flow through the honeycomb cells of the filter elements is from left to right as represented by arrows 14. A first charged (dust) particle 42 moves upwardly and to the right, as viewed in FIG. 5, with a speed and in the direction of V1. When an electric field is generated by a high voltage applied to honeycomb electrodes 32, the charged particle 42 is subjected to a Coulomb force having a direction and magnitude of V2. Consequently, dust particle 42 is subjected to the combined travel force V1 and electrostatic force V1, namely, V which correspondingly alters the direction of movement of the dust particle, and deflects it to the left, as viewed in FIG. 5, and causes it to eventually impinge on and be captured by cell wall 40 of honeycomb filter element 36. Once the particle impinges on the cell wall, electrostatic forces cause it to adhere thereto until forcibly removed therefrom.

By arranging the honeycomb filter elements 36 so that their respective cells 38 are angularly inclined the gas flow repeatedly changes its direction after impinging the cell wall. This directional change in the gas flow, together with the above-discussed electrostatic forces on the particles and greatly enhances the efficiency with which dust is collected on the dielectric honeycomb filter elements, thereby effecting a highly efficient dust collection without significant flow resistance, particularly as compared to prior art filter elements.

This observation has been borne out by experiments to remove tobacco fumes from air. When compared with prior art air filters a filter constructed as above described not only caused a complete removal of the tobacco fumes but accomplished that task in a lesser time than prior art filters, thereby demonstrating the efficacy of the present invention.

As an alternative to providing honeycomb electrodes 30, 32 shown in FIG. 4, perforated metallic sheets, wire mesh or the like can be used. However, they normally exhibit a greater flow resistance and they are structurally weaker than honeycomb. Thus, honeycomb electrodes, particularly when constructed of aluminum, have proven superior in actual use because of their reduced flow resistance together with their relatively large mechanical strength.

Referring briefly to FIGS. 6 and 7, in another embodiment of the present invention, filter section 6 is again constructed of a plurality of serially arranged honeycomb filter elements 44 sandwiched between honeycomb electrodes 46 in the above-described manner. However, the honeycomb sections are incompletely expanded as is best shown in FIG. 6 so that cells 48 are oblong, that is their vertical dimension, as is seen in FIG. 6, is greater than their horizontal direction. In filter section 6 illustrated in FIG. 7, the successive filter elements 44 are arranged perpendicular with respect to each other so that relatively high cells 48a alternate with relatively low cells 48b in successive filter elements while the cells as such are parallel to each other and, therefore, cause no directional change in the air flow through them. However, in view of the 90° offset between successive filter elements adjacent honeycomb cells in effect having differing dimensions, as if the cells in the successive elements were of a smaller size. This, in turn, assures a greater dust collecting efficiency without noticeably increasing the flow resistance through the filter elements due to the thin honeycomb cell walls. Experiments have indicated that this construction of the filter section is about as efficient as the one illustrated in FIGS. 4 and 5.

Referring now to FIG. 8, in another embodiment of the present invention, a filter section 50 for use in the electrostatic filter of the present invention is provided with multiple electrodes 52 in which the polarity of the center electrode differs from that of the outside electrodes. In this manner, thicker (in the flow direction) filter sections can be assembled by using correspondingly more honeycomb filter elements 54 to further increase the dust collecting efficiency of the filter for the filtration of particularly contaminated air flows, for example.

The dielectric honeycombed elements used in the electrostatic filter of the present invention can be made of a variety of materials having comparatively low dielectric constants such as paper, plastic film made of PVC or polyethylene and the like. Moreover, it may be advantageous to change the dielectric constant of the materials by treating, e.g. impregnating appropriate chemicals into the base material for the filter elements to give the filter elements the highest efficiency for the specific particles that must be removed from a gas stream.

I claim:

1. A filter for the removal of particles suspended in a gas flow comprising in combination: an ionizing section defined by first and second spaced apart electrodes, and means for applying an electric potential to the electrodes to effect a corona discharge therebetween; means directing the gas flow past the first and second electrodes to electrically charge particles suspended in the flow; and a filter section disposed in the gas flow downstream of the ionizing section and having third and fourth gas flow permeable, spaced apart electrodes and which are serially arranged in the flow direction of the gas flow, means for subjecting the third and fourth electrodes to an electric potential to generate an electric field therebetween which generally acts in the flow direction of the gas flow, and at least one honeycomb panel sandwiched between the third and fourth electrodes, having honeycomb cells facing the gas flow so that the gas can flow through the cells and cell walls constructed of a material having a low dielectric constant; whereby the electric field generated by the third and fourth electrodes deflects the electrically charged particles suspended in the flow through the cells lateral to their flow direction so that such particles impinge on and adhere to the cell walls and thereby become removed from the gas flow.

2. A filter according to claim 1 wherein the third and fourth electrodes are constructed of metallic honeycomb having cells oriented substantially parallel to the gas flow through the filter section.

3. A filter according to claim 1 wherein at least one of the first and second electrodes is constructed of metallic honeycomb having cells oriented substantially parallel to the gas flow through the ionizing section.

4. A filter according to claim 1 wherein the cells are non-parallel to the gas flow through the filter section.

5. A filter according to claim 4 including a plurality of serially arranged, stacked honeycomb panels.

6. A filter according to claim 5 wherein the cell walls of one honeycomb panel overlap the cells of the adjoining panel.

7. A filter according to claim 5 wherein the cells of adjoining honeycomb panels are angularly inclined with respect to each other.

8. A filter according to claim 5 wherein the cells of the honeycomb panels have an oblong cross-section, and wherein adjoining honeycomb panels are arranged so that long axes of the oblong honeycomb cell cross-sections in one panel are transverse to the long axes of the oblong honeycomb cells in the adjoining panel.

9. A filter for the removal of particles suspended in a gas flow comprising in combination: an ionizing section disposed in the gas flow defined by first and second spaced apart electrodes, and means for applying an electric potential to the electrodes to effect a corona discharge therebetween; means for flowing the gas past the first and second electrodes to electrically charge particles suspended in the flow; and a filter section disposed in the gas flow downstream of the ionizing section and having first and second, spaced apart electrodes serially arranged in the direction of the gas flow and constructed of metallic honeycomb having cells oriented substantially parallel to the gas flow through the filter section, means for subjecting the third and fourth electrodes to an electric potential to generate an electric field therebetween, and a plurality of honeycomb panels disposed in the electric field and sandwiched between the third and fourth electrodes, the panels having honeycomb cells which face the gas flow so that the gas can flow through the cells and cell walls constructed of a material having a relatively low dielectric constant, the cells of adjoining honeycomb panels being arranged so as to intercept gas flow issuing from the cells of the adjoining, upstream honeycomb panel by imparting to the gas flow a flow direction which is angularly inclined relative to the gas flow direction through the adjoining panel to facilitate the impingement of the gas flow on cell walls of the panels; whereby the electric field generated by the third and fourth electrodes causes relative to the cell walls a lateral deflection of the electrically charged particles suspended in the gas flow through the cells and, in combination with the interception of the gas flow by the honeycomb cell walls further facilitates the impinging of such particles on the cell walls so as to adhere them thereto and remove them from the gas flow.

10. A filter according to claim 9 wherein the honeycomb panels are constructed of paper.

11. A filter according to claim 9 wherein the honeycomb panels are constructed of a plastic material.

12. A filter according to claim 11 wherein the honeycomb panels are constructed of polyethylene.

13. A filter according to claim 11 wherein the honeycomb panels are constructed of polyvinyl chloride.

14. A filter according to claim 9 wherein the cells of adjoining honeycomb panels are angularly inclined with respect to each other so as to cause them to intercept the gas flow.

15. A filter according to claim 14 wherein the angular inclination between cells of adjoining honeycomb panels is between about 45° and 90°.

* * * * *